(12) United States Patent
Sano et al.

(10) Patent No.: US 8,579,621 B2
(45) Date of Patent: Nov. 12, 2013

(54) POROUS FILM MANUFACTURING METHOD AND SUCCESSIVE BIAXIAL STRETCHING APPARATUS FOR MANUFACTURING POROUS FILM

(75) Inventors: Takayoshi Sano, Fuji (JP); Satoru Nitta, Numuzu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/555,628

(22) Filed: Jul. 23, 2012

(65) Prior Publication Data
US 2012/0282362 A1    Nov. 8, 2012

Related U.S. Application Data

(62) Division of application No. 12/417,751, filed on Apr. 3, 2009, now Pat. No. 8,252,218.

(30) Foreign Application Priority Data

Apr. 4, 2008    (JP) .................................. 2008-098132

(51) Int. Cl.
*B29C 55/14*    (2006.01)

(52) U.S. Cl.
USPC ....... 425/66; 264/288.4; 264/291; 264/290.2; 425/371; 425/404

(58) Field of Classification Search
USPC ........ 264/154, 291, 235.8, 280, 288.4, 290.2; 425/371, 66, DIG. 53, 404, 394, 383
See application file for complete search history.

(56) References Cited

U.S. PATENT DOCUMENTS

| | | | | |
|---|---|---|---|---|
| 3,555,604 A | * | 1/1971 | Pahlke | ......................... 425/72.1 |
| 4,302,556 A | * | 11/1981 | Endo et al. | .................... 525/199 |
| 4,650,451 A | | 3/1987 | Herrington | |
| 4,692,380 A | * | 9/1987 | Reid | ............................. 428/349 |
| 5,424,025 A | | 6/1995 | Hanschen | |

(Continued)

FOREIGN PATENT DOCUMENTS

| | | |
|---|---|---|
| JP | 62-149413 | 7/1987 |
| JP | 11-010728 | 1/1999 |

(Continued)

OTHER PUBLICATIONS

English abstract of JP-2003-103626 published Apr. 9, 2003.

(Continued)

*Primary Examiner* — Joseph S Del Sole
*Assistant Examiner* — Nahida Sultana
(74) *Attorney, Agent, or Firm* — DLA Piper LLP (US)

(57) ABSTRACT

Provided is a method for manufacturing a high-quality porous film. Here, while the porous film is being manufactured through forming micropores by stretching, a raw film is prevented from slipping on the surfaces of the respective rolls as much as possible even though the raw film includes oil or liquid paraffin as a solvent. The method is for manufacturing a porous film through forming micropores by successive biaxial stretching. A tensile force applied to the raw film F transferring from the longitudinal stretching machine (10) to the transverse stretching machine (50) is set not less than a stretching force necessary for the longitudinal stretching, and thus the raw film is prevented from slipping on a contact surface between the raw film and each roll of the longitudinal stretching machine (10).

2 Claims, 2 Drawing Sheets

(56) References Cited

U.S. PATENT DOCUMENTS

| | | | |
|---|---|---|---|
| 6,124,043 | A | 9/2000 | Tsukamoto |
| 6,168,840 | B1 | 1/2001 | Johnstone |
| 6,198,854 | B1 | 3/2001 | Takagi |
| 7,771,826 | B2 | 8/2010 | Okano |
| 7,828,997 | B2 | 11/2010 | Otoshi |
| 8,028,383 | B2 | 10/2011 | Sano |
| 8,252,218 | B2 * | 8/2012 | Sano et al. ............... 264/288.4 |
| 8,293,160 | B2 * | 10/2012 | Yuki et al. ............... 264/288.4 |
| 2004/0166348 | A1 | 8/2004 | Taghavi |
| 2006/0008642 | A1 | 1/2006 | Marot |
| 2006/0078754 | A1 | 4/2006 | Murakami et al. |
| 2007/0084542 | A1 | 4/2007 | Montagna |
| 2007/0188686 | A1 | 8/2007 | Yano |
| 2007/0281112 | A1 | 12/2007 | Shi et al. |
| 2009/0123828 | A1 | 5/2009 | Kono |
| 2010/0013121 | A1 | 1/2010 | Hashimoto et al. |
| 2010/0113653 | A1 | 5/2010 | Ueda |
| 2010/0301510 | A1 | 12/2010 | Coburn |

FOREIGN PATENT DOCUMENTS

| | | |
|---|---|---|
| JP | 2002-067141 | 3/2002 |
| JP | 2003-103626 | 4/2003 |
| JP | 2005-343958 | 12/2005 |
| JP | 2007-301978 | 11/2007 |
| JP | 2008-080577 | 4/2009 |
| WO | WO 2006-129685 | 12/2006 |
| WO | WO 2007/029848 | 3/2007 |
| WO | WO 2007/034972 | 3/2007 |
| WO | WO 2008/038616 | 4/2008 |

OTHER PUBLICATIONS

English language translation of JP-2003-103626 published Apr. 9, 2003.
U.S. Appl. No. 12/417,751 (Now U.S. Patent 8,252,218 issued Aug. 28, 2012) as of Nov. 20, 2012.
Japanese Office Action issued in JP 2008-098132 on Oct. 30, 2012.
English Language Translation of Japanese Office Action issued in JP 2008-098132 on Oct. 30, 2012.
English Language Abstract of JP 2005-343958 published Dec. 5, 2005.
English Language Translation of JP 2005-343958 published Dec. 5, 2005.
English Language Abstract of JP 2002-067141 published Mar. 5, 2002.
English Language Translation of JP 2002-067141 published Mar. 5, 2002.
English Language Abstract of JP 11-010728 published Jan. 19, 1999.
English Language Translation of JP 11-010728 published Jan. 19, 1999.
English Language Abstract of JP 2007-301978 published Nov. 27, 2007.
English Language Translation of JP 2007-301978 published Nov. 27, 2007.
English Language Abstract of JP 62-149413 published Jul. 3, 1987.
English Language Abstract of JP 2008-080577 published Apr. 10, 2008.
English Language Translation of JP 2008-080577 published Apr. 10, 2008.

* cited by examiner

POROUS FILM MANUFACTURING METHOD AND SUCCESSIVE BIAXIAL STRETCHING APPARATUS FOR MANUFACTURING POROUS FILM

This application is a divisional of U.S. application Ser. No. 12/417,751 filed Apr. 3, 2009, which claims priority to JP 2008-098132 filed Apr. 4, 2008. The entirety of all of the above-listed Applications are incorporated herein by reference.

BACKGROUND OF THE INVENTION

1. Field of the Invention

The present invention relates to a porous film manufacturing method and a successive biaxial stretching apparatus for manufacturing a porous film. Particularly, the present invention relates to a porous film manufacturing method in which micropores are formed by stretching by use of phase separation in a binary system, and to the successive biaxial stretching apparatus for manufacturing the porous film.

2. Description of the Related Art

There is known a method for manufacturing a porous film having micropores, which is used for a battery separator, a hemodialysis membrane, an air-permeable film, a filter or the like. The method includes: thermally melting polyethylene (polyolefin) powder by using oil or liquid paraffin as a solvent; performing phase separation; and thereafter forming micropores by stretching (see Japanese Patent Application Laid-Open No. 2003-103626, for example).

A raw film includes oil or liquid paraffin as a solvent, and is thermally stretched. For these reasons, a large amount of oil is precipitated on the surfaces of the raw film. A general longitudinal stretching machine is not capable of stably stretching the raw film during its roll stretching (longitudinal stretching) operation, because the raw film slips on the surfaces of the respective rolls. In addition, bubbles occur to be involved in an interstice between each roll and the raw film, thereby causing unevenness in heating. This also makes it impossible to perform stable stretching.

SUMMARY OF THE INVENTION

The present invention has been achieved with such points in mind.

It therefore is an object of the present invention to provide a porous film manufacturing method and a successive biaxial stretching apparatus for manufacturing a porous film, by which a high-quality porous film suitably used as a battery separator and the like can be manufactured by forming micropores on a stable stretching operation, in a manner such that; a raw film is prevented from slipping on the surfaces of the respective rolls as much as possible even though the raw film includes oil or liquid paraffin as a solvent during the stretching operation, and that; bubbles are prevented from being involved in an interstice between the raw film and each roll during the stretching operation.

To achieve the object, according to a first aspect of the present invention, there is provided a porous film manufacturing method including the steps of: thermally melting polyethylene powder by using oil or liquid paraffin as a solvent; performing phase separation; and thereafter forming micropores by successive biaxial stretching, in which a raw film is stretched longitudinally by a longitudinal stretching machine and then stretched transversely by a transverse stretching machine. In this method, a tensile force applied to the raw film transferring from the longitudinal stretching machine to the transverse stretching machine is set equal to or larger than a stretching force necessary for the longitudinal stretching, and thus the raw film is prevented from slipping on a contact surface between the raw film and each roll of the longitudinal stretching machine.

According to a second aspect of the present invention, as it depends from the first aspect, there is provided the porous film manufacturing method wherein it is desirable that: circumferential speed ratios among the multiple rolls of the longitudinal stretching machine should be set up on the basis of section drives; a circumferential speed of each outlet-side roll of the longitudinal stretching machine should be set higher than that of each inlet-side roll of the longitudinal stretching machine; and thus the raw film should be prevented from slipping on the contact surface between the raw film and each roll of the longitudinal stretching machine.

According to a third aspect of the present invention, as it depends from the first aspect or the second aspect, there is provided the porous film manufacturing method wherein it is desirable that in the longitudinal stretching machine; nip rolls should be used, each nip roll including a soft rubber with a rubber hardness of JIS-A60 or less as well as with a thickness of 3 mm or more in its roll surface; and the raw film should be nipped by each nip roll with a linear pressure of 2 Kg/cm or less.

According to a fourth aspect of the present invention, there is provided a successive biaxial stretching apparatus used to manufacture a porous film by: thermally melting polyethylene powder by using oil or liquid paraffin as a solvent; performing phase separation; and thereafter forming micropores by successive biaxial stretching, in which a raw film is stretched longitudinally by a longitudinal stretching machine and then stretched transversely by a transverse stretching machine. In this apparatus, a tensile force applied to the raw film transferring from the longitudinal stretching machine to the transverse stretching machine is to configured to be equal to or larger than a stretching force necessary for the longitudinal stretching, and thus the raw film is prevented from slipping on a contact surface between the raw film and each roll of the longitudinal stretching machine.

In the porous film manufacturing method and the successive biaxial stretching apparatus according to the first aspect to the fourth aspect of the present invention, the tensile force applied to the raw film transferring from the longitudinal stretching machine to the transverse stretching force is set equal to or more than the stretching force necessary for the longitudinal stretching. Thereby, the raw film is pulled by a force of the transverse stretching machine with the raw film being gripped by the transverse stretching machine. This prevents the raw film from slipping on the surfaces of the respective rolls, and makes the raw film stretched stably.

Furthermore, because each nip roll including the soft rubber with a rubber hardness of JIS-A60 or less as well as with a thickness of 3 mm or more in its roll surface nips the raw film with a linear pressure of 2 Kg/cm or less, the method and the apparatus prevents bubbles from being involved in an interstice between the raw film and each roll. This makes the raw film stretched stably as well.

BRIEF DESCRIPTION OF THE ACCOMPANYING DRAWINGS

DETAILED DESCRIPTION OF THE PREFERRED EMBODIMENT

Figure 1:
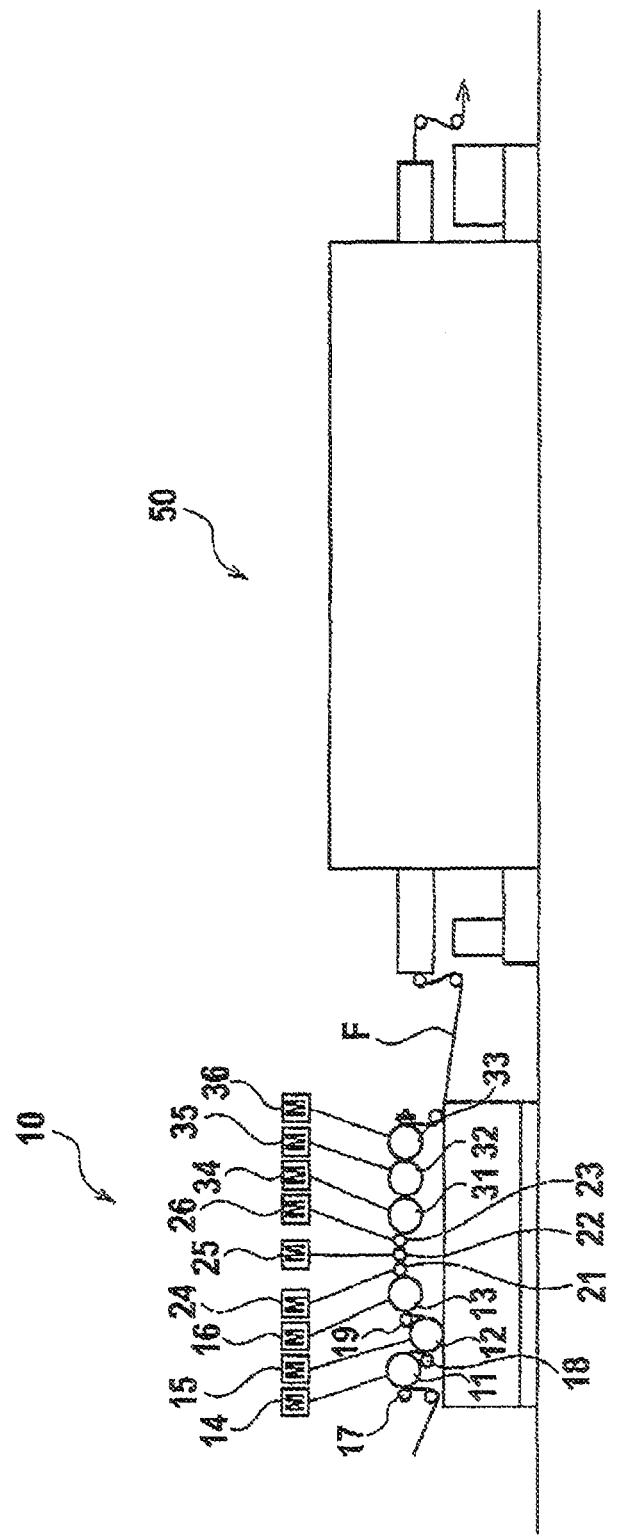
FIG. 1 is an overall block diagram showing an embodiment of a successive biaxial stretching apparatus which is used when a porous film manufacturing method according to the present invention is carried out.

Referring to FIG. 1, descriptions will be provided for an embodiment of a successive biaxial stretching apparatus which is used when a porous film manufacturing method according to the present invention is carried out.

When viewed in a direction in which a raw film F travels (in a direction from the left side to the right side in FIG. 1), the successive biaxial stretching apparatus includes a longitudinal stretching machine 10 and a transverse stretching machine 50 sequentially. The longitudinal stretching machine 10 longitudinally stretches the raw film F. Subsequently, the transverse stretching machine 50 transversely stretches the raw film F. The raw film F is produced by thermally melting polyethylene powder by using oil or liquid paraffin as a solvent, and by causing a thus-produced mixture to separate into phases.

The longitudinal stretching machine 10 is of a multiple-roll type. The longitudinal stretching machine 10 includes: three metal heating rolls 11, 12, 13 which are arranged in an inlet side of the longitudinal stretching machine; three metal stretching rolls 21, 22, 23 which are arranged in the middle portion of the longitudinal stretching machine; and three metal cooling rolls 31, 32, 33 which are arranged in an outlet side of the longitudinal stretching machine. Thereby, the longitudinal stretching machine longitudinally stretches the raw film F.

These rolls 11, 12, 13, 21, 22, 23, 31, 32, 33 are drivingly connected to electric motors 14, 15, 16, 24, 25, 26, 34, 35, 36, respectively. These rolls are configured so that their circumferential speed ratios can be set up on the basis of section drive.

Thereby, for instance, the circumferential speed of the heating rolls 11, 12, 13 is set at V1; the circumferential speed of the stretching rolls 21, 22, 23 is set at V2; and the circumferential speed of the cooling rolls 31, 32, 33 is set at V3. These roll circumferential speeds have a relationship of V1<V2<V3. It is desirable that the circumferential speed V2 of the stretching rolls 21, 22, 23 should be set 4 to 6 times as fast as the circumferential speed V1 of the heating rolls 11, 12, 13 with their slips taken into consideration. In addition, it is desirable that the circumferential speed V3 of the cooling rolls 31, 32, 33 should be set 4 to 6 times as fast as the circumferential speed V2 of the stretching rolls 21, 22, 23 with their slips taken into consideration.

This circumferential speed setting prevents the raw film F from slipping on a contact surface between the raw film F and each of the rolls 11, 12, 13, 21, 22, 23, 31, 32, 33 of the longitudinal stretching machine 10.

Figure 2:
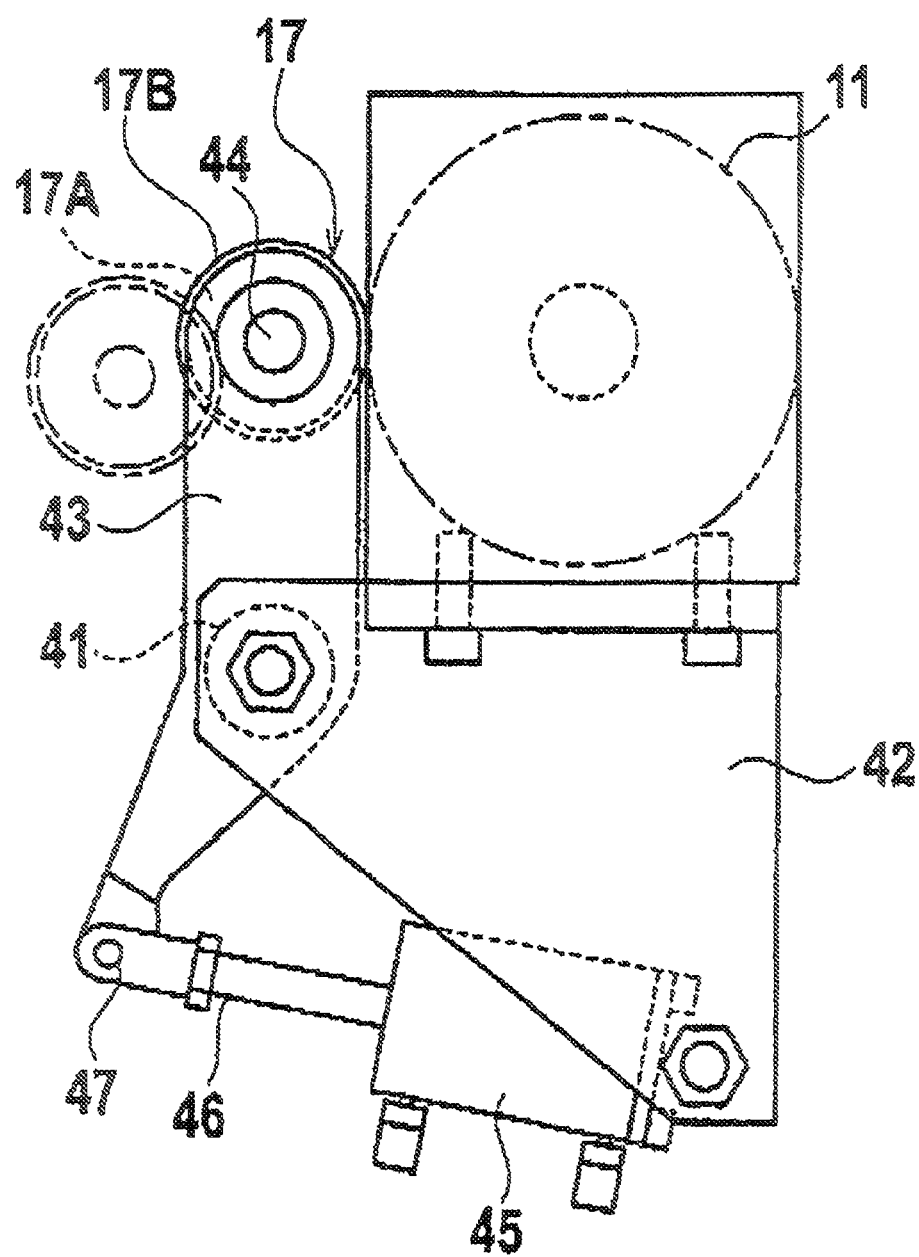
FIG. 2 is a block diagram showing an embodiment of a nip roll part included in the successive biaxial stretching apparatus which is used when to the porous film manufacturing method according to the present invention is carried out.

The heating rolls 11, 12, 13 are respectively provided with nip rolls 17, 18, 19. A nip roll structure will be described by referring to FIG. 2. Because the nip rolls 17, 18, 19 have the same structure, FIG. 2 illustrates the nip roll 17 accompanying the heating roll 11 by selecting the nip roll 17 as a representative of the three nip rolls.

The nip roll 17 is attached to an end of a swing arm 43 in a way that the nip roll 17 is pivotally rotatably supported by a shaft 44, and the swing arm 43 is attached to a housing 42 such that the swing arm 43 is rotatably supported by a pivot 41. The nip roll 17 is configured by including: a to metal roll main body 17A; and a cylindrical roll surface member 17B made of a soft rubber adhered to the outer circumferential surface of the roll main body 17A. The roll surface member 17B nips the raw film F, and thus presses the raw film F against the surface of the heating roll 11.

The roll surface member 17B is made up of an EPDM (standing for ethylene propylene dien methylene) rubber or the like. The rubber hardness of the EPDM rubber used for the roll surface member 17B is set at JIS-A60 (corresponding to ISO 7619 at A/60/1 or ASTM D 2240 at A/60/1) or less, and the thickness of the rubber hardness of the EPDM rubber used for the roll surface member 17B is set at 3 mm or more, so that a higher nip adhesiveness can be obtained to prevent bubbles from being involved in the interstice between the raw film F and the heating roll 11.

A piston rod 46 of a pneumatic cylinder device 45 attached to the housing 42 is connected to the other end of the swing arm 43 by use of a pin 47. When the swing arm 43 is driven clockwise about the pivot 41 by the pneumatic cylinder device 45, the nip roll 17 is pressed against the heating roll 11. Thus, the nip pressure is set up by the pneumatic pressure of the pneumatic cylinder device 45.

For the purpose of preventing bubbles from being involved in the interstice between the raw film F and the heating roll 11, it is desirable that this nip pressure (linear pressure) should be equal to or less than 2 Kg/cm, and it is more desirable that the nip pressure should be 0.3 Kg/cm to 1.0 Kg/cm.

The rubber hardness of the roll surface member 17B of the nip roll 17 is set at JIS-A60 or less; the thickness of the roll surface member 17B thereof is set at 3 mm or more; the nip pressure is desirably equal to or less than 2 Kg/cm, and more desirably 0.3 Kg/cm to 1.0 Kg/cm. As a result, bubbles are no longer involved in the interstice between the heating roll 11 (12, 13) and the raw film F, and the raw film F is no longer heated unevenly. Thereby, the raw film F is stretched stably.

Although a detailed illustration of the transverse stretching machine 50 is omitted, the transverse stretching machine 50 transversely stretches the raw film F by gripping the two side edge portions of the raw film F by use of its respective clips. The transverse stretching machine 50 has the same configuration as a conventional type of transverse stretching machine.

A speed at which the raw film F travels in the transverse stretching machine 50 is set up such that a tensile force applied to the raw film F transferring from the longitudinal stretching machine 10 to the transverse stretching machine 50 is equal to or larger than a stretching force necessary for the transverse stretch. The speed is set up such that the tensile force is larger than the stretching force, and preferably larger by 20%.

With this setting, the raw film F is pulled by a force of the transverse stretching machine 50 with the raw film F being gripped by the transverse stretching machine 50. This prevents the raw film F from slipping on the surfaces of the respective rolls included in the longitudinal stretching machine 10. Accordingly, the raw film F is stretched stably.

With the above configuration, the porous film manufacturing method according to the present invention avoids the slip of the raw film on the rolls, or prevents the raw film from slipping on the rolls as much as possible, while the raw film is being longitudinally stretched. This holds true even though the raw film includes oil or liquid paraffin as a solvent to an extent that the raw film is slippery on the rolls. In addition, the method prevents bubbles from being involved in an interstice between the raw film and each roll, and stably stretches the raw film. Consequently, the method makes it possible to manufacture a high-quality porous film which is used as a battery separator and the like.

The entire contents of Japanese Patent Application No. 2008-098132 (filed on Apr. 4, 2008) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

What is claimed is:

1. A successive biaxial stretching apparatus used to manufacture a porous film comprising:
    a longitudinal stretching machine stretching the raw film in a longitudinal direction of the raw film, the longitudinal stretching machine comprising a plurality of rolls which contact the raw film;
    a transverse stretching machine receiving the raw film from the longitudinal stretching machine, and stretching the raw film in a transverse direction of the raw film; and
    a tensile force applying section applying a tensile force to the raw film positioned between an outlet section of the longitudinal stretching machine and an inlet section of the transverse stretching machine as the raw film is transferred from the longitudinal stretching machine to the transverse stretching machine, the tensile force being set not less than a stretching force necessary for the longitudinal stretching by the longitudinal stretching machine, so that the raw film is prevented from slipping on a contact surface between the raw film and each of the plurality of rolls of the longitudinal stretching machine, wherein
    the plurality of rolls of the longitudinal stretching machine comprises a heating roll arranged in an inlet side of the longitudinal stretching machine, a cooling roll arranged in an outlet side of the longitudinal stretching machine, and a stretching roll arranged between the heating roll and the cooling roll;
    the circumferential speed of the stretching roll is set 4 to 6 times as fast as the circumferential speed of the heat roll and the circumferential speed of the cooling roll is set 4 to 6 times as fast as the circumferential speed of the stretching roll, so that the raw film is prevent from slipping contact surface between the raw film and each of the heating roll, stretching roll and a cooling roll of the longitudinal stretching machine;
    the longitudinal stretching machine comprises a plurality of nip rolls being mounted in a swing arm, and each nip roll including a soft rubber on its roll surface, the soft rubber having a rubber hardness of not more than JIS-A60 and a thickness of not less than 3 mm; and
    the raw film is nipped by each nip roll with a linear pressure of not more than 2 Kg/cm in a manner such that each nip roll mounted in a swing arm is pressed against the stretching roll when the swing arm is swung by a cylinder device.

2. The successive biaxial stretching apparatus according to claim 1, wherein, the linear pressure of the each nip roll against the stretching roll is 0.3 Kg/cm to 1 Kg/cm.

* * * * *